United States Patent [19]

Kono

[11] 4,067,300
[45] Jan. 10, 1978

[54] ROTARY PISTON ENGINE

[75] Inventor: Toshiyuki Kono, Toyoake, Japan

[73] Assignee: Toyota Jidosha Kogyo Kabushiki Kaisha, Toyota, Japan

[21] Appl. No.: 588,503

[22] Filed: June 19, 1975

[30] Foreign Application Priority Data

Feb. 25, 1975 Japan .................................. 50-23333

[51] Int. Cl.² .............................................. F02B 53/04
[52] U.S. Cl. .................................................... 123/8.13
[58] Field of Search ...................... 123/8.01, 8.13, 8.45

[56] References Cited

U.S. PATENT DOCUMENTS

| | | | |
|---|---|---|---|
| 3,136,302 | 6/1964 | Nallinger et al. | 123/8.09 X |
| 3,244,153 | 4/1966 | Froede | 123/8.45 |
| 3,411,487 | 11/1968 | Tado | 123/8.45 X |
| 3,456,623 | 7/1969 | Weigert et al. | 123/8.45 |
| 3,514,235 | 5/1970 | Yamauchi | 123/8.45 UX |
| 3,587,534 | 6/1971 | Weichelt | 123/8.45 X |
| 3,780,707 | 12/1973 | Cole | 123/8.13 |
| 3,844,256 | 10/1974 | Ishikawa et al. | 123/8.45 |
| 3,885,003 | 5/1975 | Kobayashi et al. | 123/8.13 X |
| 3,915,126 | 10/1975 | Kishimoto et al. | 123/8.13 |

Primary Examiner—Carlton R. Croyle
Assistant Examiner—Michael Koczo, Jr.
Attorney, Agent, or Firm—Birch, Stewart, Kolasch & Birch

[57] ABSTRACT

A rotary piston engine having peripheral and side intake ports, said peripheral intake port being supplied with a fuel-air mixture while said intake port being supplied with only air, wherein a check valve is provided in an intake passage which supplies the fuel-air mixture to said peripheral intake port.

2 Claims, 7 Drawing Figures

ROTATIONAL ANGLE OF ECCENTRIC SHAFT (a)

(b)

(c)

(d)

ROTARY PISTON ENGINE

BACKGROUND OF THE INVENTION

1. Field of the Invention

The present invention relates to a rotary piston engine and, more particularly, to an improvement in a rotary piston engine with respect to the fuel consumption rate and exhaust gas purification.

2. Description of the Prior Art

In the Wankel type rotary piston engine comprising a casing composes of a rotor housing which has a trochoidal inner peripheral surface and side housings which close opposite ends of said rotor housing, and a polygonal rotor adapted to rotate eccentrically in said casing with its apex portions sliding over said trochoidal inner peripheral surface, the flame initiated by an ignition plug propagates at a very high speed toward the leading side located at the rotational forward end of the rotor by the effect of the flow of the fule-air mixture caused by the rotation of the rotor and thus the flame does not propagate well toward the trailing side located at the rearward end of the rotor. Therefore, the fuel-air mixture is combusted well at the leading side while the mixture is not completely combusted at the trailing side thereby causing a relatively low combustion efficiency and a relatively high fuel consumption accompanied by an additional drawback that the emission of harmful uncombusted components such as CO and HC is relatively high.

To solve the abovementioned problem, an improved rotary piston engine has been developed wherein a relatively rich fuel-air mixture is supplied at the leading side where fuel-air mixture is easily combusted while only air is supplied at the trailing side where the combustion of a fuel-air mixture is not favorably effected so that a combustion chamber of the engine is charged with two separate layers of fuel-air mixture and air, as is disclosed in Japanese Patent Application No. 71426/74 filed by the same assignee as the present application. This rotary piston engine comprises a first intake port which opens in the trochoidal inner peripheral surface of the rotor housing and a second intake port which opens in the inner surface of the side housing at a position advanced from said first intake port as seen in the rotational direction of the rotor wherein the fuel-air mixture is supplied from said first port while only air is supplied from said second port.

Now, in this connection, in a rotary piston engine wherein the entire or a part of the intake fuel-air mixture or air is supplied through a peripheral port which opens in the trochoidal inner peripheral surface of a rotor housing, there occurs a pulsation in the intake flow through the peripheral port which causes a reverse flow of the fuel-air mixture including exhaust gas blown from the peripheral intake port toward the intake passage during an intake stroke, when the engine is operated in a low speed and low load condition. If the reverse flow of the fuel air mixture including the exhaust gas occurs, the intake efficiency lowers and, furthermore, a pulsating flow is induced in the air passage of the carburetor thereby causing poor fuel consumption. To solve this problem, according to the present invention a check valve is provided in the intake passage which leads to the peripheral intake port, as disclosed in Japenese Patent Application No. 3542/75 filed by the same assignee as the present application to whom the former invention has been assigned.

SUMMARY OF THE INVENTION

The present invention contemplates preventing a reverse flow which would occur in the intake passage leading to the peripheral intake port of a rotary piston engine as proposed by the aforementioned Japanese Patent Application No. 71426/74 wherein the peripheral port serves as a sole intake port for supplying fuel-air mixture, by incorporating the invention of the aforementioned Japanese Patent Application No. 3542/75, for the purpose of further improving fuel consumption and reducing emission of harmful uncombusted components.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

To accomplish the abovementioned object, the present invention proposes a rotary piston engine comprising a casing composed of a rotor housing which has a trochoidal inner peripheral surface and side housings which close opposite ends of said rotor housing, and a polygonal rotor adapted to rotate eccentrically in said casing with its apex portions sliding over said trochoidal inner peripheral surface, characterized by a first intake port which opens the said trochoidal inner peripheral surface, a second intake port which opens to an inner surface of said side housing at a position advanced from said first intake port as seen in the rotational direction of the rotor, said first port being supplied with fuel-air mixture while said second port being supplied with only air, and a check valve provided in the passage which supplies the fuel-air mixture to said first intake port.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
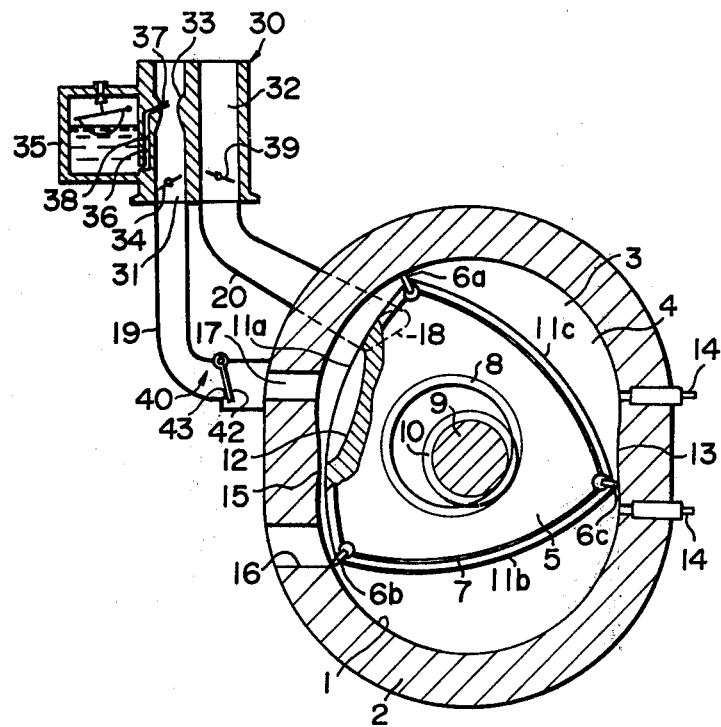
FIG. 1 is a schematical sectional view showing an embodiment of the rotary piston engine according to the present invention.
Figure 2:
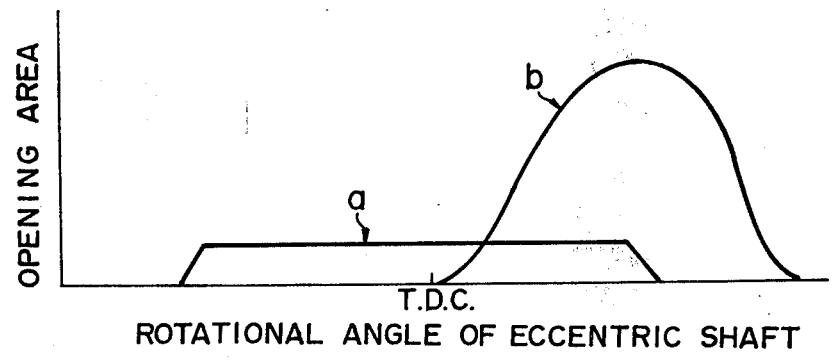
FIG. 2 is a graph which shows the relationship between the opening areas of peripheral and side ports and their timing of opening and closing in the engine shown in FIG. 1.

The rotary piston engine shown in FIG. 1 as an embodiment of the present invention incorporates the features of the aforementioned prior inventions disclosed in Japanese Patent Applications Nos. 71426/74 and 3542/75. In FIG. 1, a rotor housing 2 having a trochoidal inner peripheral surface 1 is assembled with side housings 4 each having a plane inner surface 3 to constitute a casing in which a triangular rotor 5 is mounted to rotate eccentrically with its apex seals 6a—6c contacting the trochoidal inner surface 1. The side seals 7 provided along three edges of the rotor are contacted by the inner surface 3, with the eccentric rotation of the rotor being defined by meshing of an internal gear 8 of the rotor with a fixed gear 10 provided around an eccentric shaft 9. Three arched peripheral surfaces 11a -11c of the rotor are formed with recesses 12 at their central portions. Two ignition plugs 14 are provided at the short axis portion 13 of the trochoidal inner peripheral surface 1 of the rotor housing. Adjacent another short axis portion 15, an exhaust port 16 is provided at a rear side as seen in the rotational direction of the rotor, while a peripheral intake port 17 is provided at a portion advanced from the short axis portion 15 as seen in the rotational direction of the rotor. As further advanced from the port 17 in the rotational direction of the rotor, a side port 18 is provided to open in the flat inner surface 3 of the side housing 4. The opening area of the peripheral port 17 is, as shown by curve "a" in FIG. 2, maintained at a relatively small value throughout a region extending before and after the top dead center, (T.D.C.) while the opening area of the side port 18 abruptly increases after the rotational angle of the eccentric shaft 9 has passed the top dead center to reach its maximum value which is several times larger than that of the peripheral port at a phase when the peripheral port begins to close, thereafter again abruptly decreasing toward zero, as shown by curve "b" in FIG. 2.

The ports 17 and 18 are respectively connected to a fuel-air mixture supply passage 31 and an air supply passage 32 of a carburetor 30 by intake tubes 19 and 20. The mixture supply passage 31 comprises a Venturi 33, a throttle valve 34, a float chamber 35, and a fuel passage 36 which supplies fuel from the float chamber to a nozzel 37 to produce the fuel-air mixture to be supplied to the peripheral port 17. The fuel-air mixture produced by the mixture supply passage 31 is always made richer than a theoretical air/fuel ratio by adjustment of a jet 38 provided in the passage 36 and other adjustable elements. The air supply 32 is provided with a flow control valve 39 which is operationally interconnected with the throttle valve 34, said air supply passage supplying only air from an air cleaner (not shown) to the side port 18.

Figure 3:
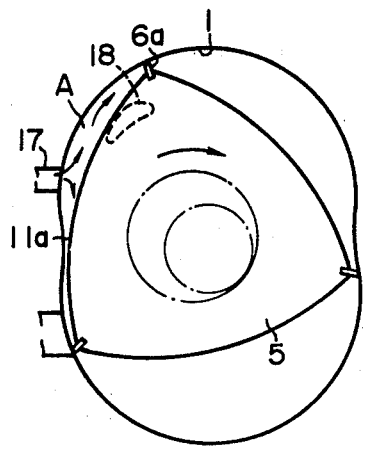
FIGS. 3a—d are diagrammatic views which illustrate individual operating conditions of the engine shown in FIG. 1.
Figure 3:
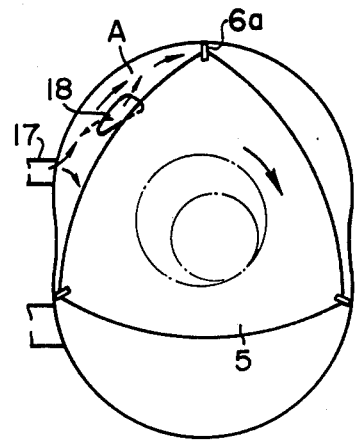
Figure 3:
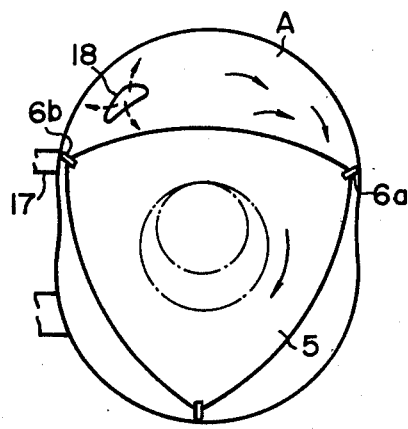
Figure 3:
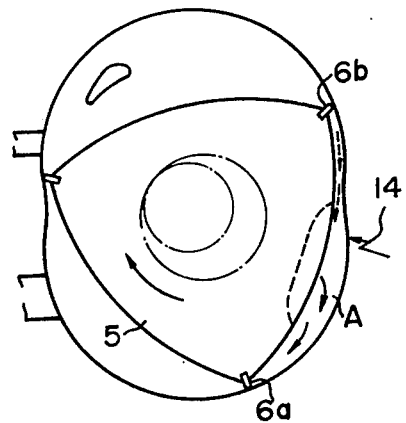

Operation of the rotary piston engine shown in FIG. 1 is explained with reference to FIG. 3. In a former half of an intake stroke, as shown in FIG. 3a, the peripheral port 17 is opened after the apex seal 6a has traversed thereover, whereby the rich fuel-air mixture produced by the mixture supply passage 31 of the carburetor 30 is introduced into a combustion chamber A formed between the arc peripheral surface 11a and the inner peripheral surface 1. The mixture thus introduced into the combustion chamber flows toward the leading side or the region adjacent the apex seal 6a due to the rotation of the rotor 5. When the eccentric rotation of the rotor has proceeded so far that the side seal 7 traverses the side port 18, as shown in FIB. 3b, the side port 18 is gradually opened, thereby gradually increasing the amount of air introduced into the combustion chamber A from the air supply passage 32 of the carburetor 30. When the next apex seal 6b has traversed over the peripheral port 17, as shown in FIG. 3c, the supply of the rich fuel-air mixture is stopped and only a large amount of air is supplied into the combustion chamber A from the fully opened side port 18, thereby filling the trailing side of the combustion chamber principally with air, in contrast to the leading side which has already been filled with the rich fuel-air mixture. Thus, by the time the side port 18 is again closed by the traverse of the side seal 7, the combustion chamber is charged with separated layers of rich fuel-air mixture filling the leading side thereof and air filling the trailing side thereof. As the rotor further rotates, the layered mass of fuel-air mixture and air is compressed and at the end of the compression stroke as shown in FIG. 3d, the ignition plug 14 is actuated thereby the rich fuel-air mixture filling the leading side of the combustion chamber is explosively combusted as flame propagates toward the leading side, thereby accomplishing complete combustion of fuel-air mixture while no substantial combustion is effected at the trailing side. As the rotor further rotates, the combustion gas is transferred toward the exhaust port 16 and exhausted from the housing.

Figure 4:
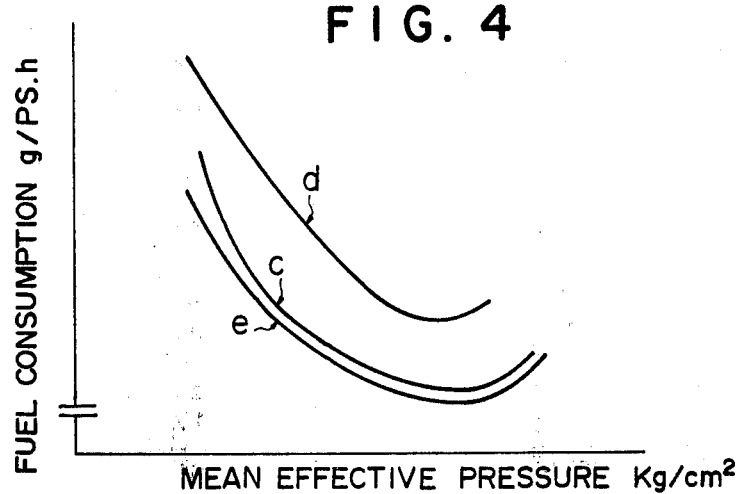
FIG. 4 is a graph showing a comparison of fuel consumption rate of the engine shown in FIG. 1. and other conventional engines.

As explained above, by charging fuel-air mixture principally at the leading side of the combustion chamber wherein the combustion is easily effected while charging air principally at the trailing side where the combustion is more difficult to effect, more perfect combustion of the fuel is accomplished. The improvement in the combustion is shown by the comparison of fuel consumption in FIG. 4, wherein curve $c$ shows the rotary piston engine according to the present invention while curve $d$ shows the fuel consumption of a conventional rotary piston engine. From the comparison of curves $c$ and $d$, it will be appreciated that the present invention provides for a significant reduction of fuel consumption to the extent that it nearly approaches that of a reciprocating engine shown by curve $e$. By the improvement in the combustion of fuel, the emission of harmful uncombusted components such as CO and HC in the exhaust gas is automatically reduced.

Figure 5:
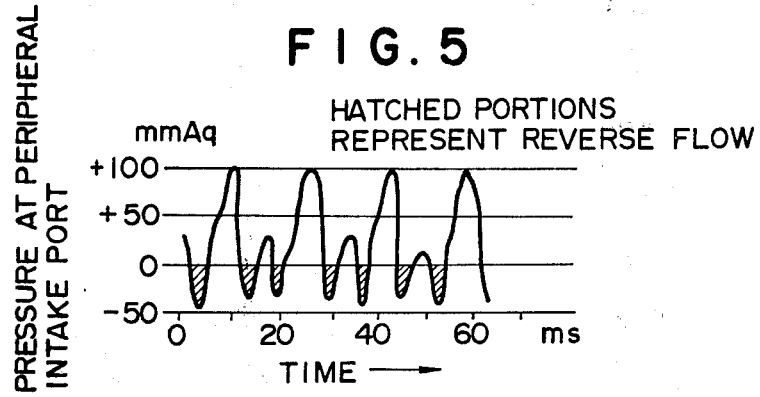
FIG. 5 is a graph showing the pressure fluctuation in a peripheral intake port in a low speed low load condition.

FIG. 5 shows an example of pressure fluctuation measured at the peripheral intake port. In this figure, the ordinate represents a pressure difference ($mmAq$) generated in a laminar flow meter for measuring the flow of the fuel-air mixture in the intake tube 19 and the abscissa ($ms$) represents the actual time elapsed which is measured in milliseconds. The hatched portion where the pressure difference becomes negative or reversed means that the flow direction in the tube is reversed, or in other words, a reverse flow of the exhaust gas has occurred. To prevent this reverse flow, a check valve generally designated by reference numeral 40 is incorporated in the intake tube 19 as shown in FIG. 1.

Figure 6:
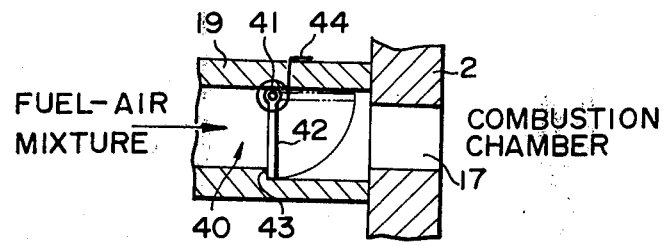
FIG. 6 is a sectional view showing a detailed structure of a check valve incorporated in the engine shown in FIG. 1; and, FIG. 7 is a sectional view showing a modification of the check valve to be incorporated in the engine according to the present invention.

FIG. 6 is a cross-sectional view showing the intake tube 19 and the peripheral intake port 17, wherein the structure of the check valve 40 is shown in more detail. The check valve 40 comprises a valve member 42 rotatably mounted by a pivot shaft 41, said valve member 42 being adapted to abut against a valve seat 43 to prevent reverse flow which flows from the intake port 17 toward the intake tube 19. For the normal flow which flows from the intake tube 19 toward the port 17, the valve member 42 rotates around the pivot shaft 41 in a counter-clockwise direction as seen in the figure and the check valve is fully opened when the valve member takes the position shown by phantom line in the figure. The valve member 42 is biased by a coil spring 44 to rotate clockwise around the pivot shaft 41 so that if the normal flow through the check valve 40 stops or a reverse flow occurs, the valve member 42 instantly abuts against the valve seat 43 to close the check valve.

Figure 7:
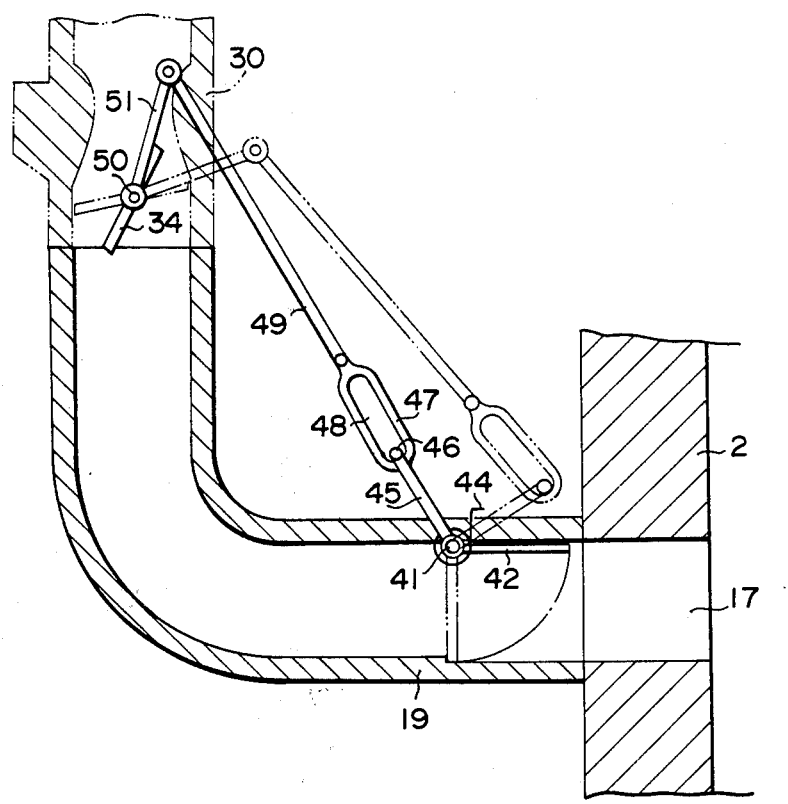

FIG. 7 shows an embodiment of operationally interconnecting the check valve 40 with the throttle valve 34 of the carburetor 30. The aforementioned reverse flow of fuel-air mixture including exhaust gas becomes significant when the engine is operating in a low speed, low load condition. When the engine is operating above a certain speed and load condition, the check valve has an adverse effect of lowering intake efficiency. Therefore, it is desirable that the check valve 40 is operationally interconnected with the throttle valve 34 in a manner that when the throttle valve is opened beyond a certain opening, the check valve 40 is forcibly opened. In the structure shown in FIG. 7, the valve member 42 is connected with an arm 45 which drives the valve member about the pivot shaft 41, said arm being engaged at its free end 46 with a slot 48 of a link element 47. The link element 47 is connected with another link element 49, which in turn is connected with an arm 51 mounted to a rotary shaft 50 of the throttle valve 34. By this arrangement, when the throttle valve 34 is positioned at or close to its fully closed position shown by phantom line in the figure, the link element 47 is released thereby permitting the valve member 42 to return to its fully closed position shown by the phantom line in the figure. In this condition, when a normal flow is generated through the intake tube 19 toward the intake port 17, the valve member 42 is properly rotated toward its open position against the biasing of the coil spring 44 by being driven by an intake flow. In contrast, when the throttle valve 34 is widely opened as shown by solid line in the figure, the link element 47 is expanded thereby forcibly maintaining the valve member 42 at its fully opened position shown by solid line in the figure by way of the arm 45.

From the foregoing, it will be appreciated that by separately supplying a fuel-air mixture and air to a peripheral port and a side port respectively thereby effecting a two layered charge of fuel-air mixture and air in the combustion chamber in a manner to facilitate perfect combustion of the fuel, coupled with the provision of a check valve being provided in an intake passage which supplies the fuel-air mixture to the peripheral port for preventing reverse flow in the passage in a low speed and low load operation of the engine, fuel consumption is substantially improved together with a significant reduction in the emission of harmful uncombusted components in the exhaust gas of the rotary piston engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A rotary piston engine comprising:
   a casing composed of a rotor housing which has a trochoidal inner peripheral surface and side housings which close opposite ends of said rotor housing;
   a polygonal rotor disposed in said casing and adapted to rotate eccentrically therein;
   said polygonal rotor containing apex portions which slide over said trochoidal inner peripheral surface;
   said casing being provided with a first intake port which opens to said trochoidal inner peripheral surface and a second intake port which opens to the inner surface of said side housing at a position advanced from said frist intake port as seen in the rotational direction of the rotor;
   supply means and passage means for supplying a fuel-air mixture to said first intake port;
   means for supplying only air to said second intake port;
   a check valve provided in said passage means, said check valve being adapted to permit a flow through said passage means from said fuel-air mixture supply means toward said first intake port and to prevent a flow through said passage means in the opposite direction;
   a throttle valve provided in said fuel-air mixture supply means and a linkage mechanism operationally interconnecting said check valve with said throttle valve; and
   said linkage mechanism being adapted to forcibly open said check valve when said throttle valve is opened beyond a predetermined limit.

2. A rotary piston engine comprising:
   a casing composed of a rotor housing which has a trochoidal inner peripheral surface and side housings which close opposite ends of said rotor housing;
   a polygonal rotor disposed in said casing and adapted to rotate eccentrically therein;
   said polygonal rotor containing apex portions which slide over said trochoidal inner peripheral surface;
   said casing being provided with a first intake port which opens to said trochoidal inner peripheral surface and a second intake port which opens to the inner surface of said side housing at a position advanced from said first intake port as seen in the rotational direction of the rotor;
   supply means and passage means for supplying a fuel-air mixture to said first intake port;
   means for supplying only air to said second intake port;
   a check valve provided in said passage means, said check valve being adapted to permit a flow through said passage means from said fuel-air mixture supply means toward said first intake port and to prevent a flow through said passage means in the opposite direction;
   said passage means being provided with a valve seat;
   said check valve comprises a flap element rotatably supported by a pivot shaft for selectively traversing said passage means;
   said flap element being adapted to abut against said valve seat and close said passage means at a first end position of its rotation while fully opening said passage means when it is rotated to a second end position of its rotation;
   said flap element being biased toward said first end position of rotation by a coil spring;
   said flap element being connected with an arm which is co-rotatable with said flap element around said pivot shaft, the free end of said arm being engaged with a slot of first link element;

said first link element being connected with a second link element; and said second link element being connected with a second arm which is in turn connected with a throttle valve provided in the fuel-air mixture supply passage means of a carburetor to be co-rotatable with said throttle valve around a second pivot shaft for said throttle valve;

whereby when said throttle valve is opened beyond a predetermined opening, said flap element is forcibly rotated to said second end position of rotation by a linkage composed of said first mentioned arm, first and second link elements and said second arm.

* * * * *